March 17, 1942.    J. G. LUKES    2,276,403
BROODER HOUSE ENTRANCE
Filed Jan. 29, 1940
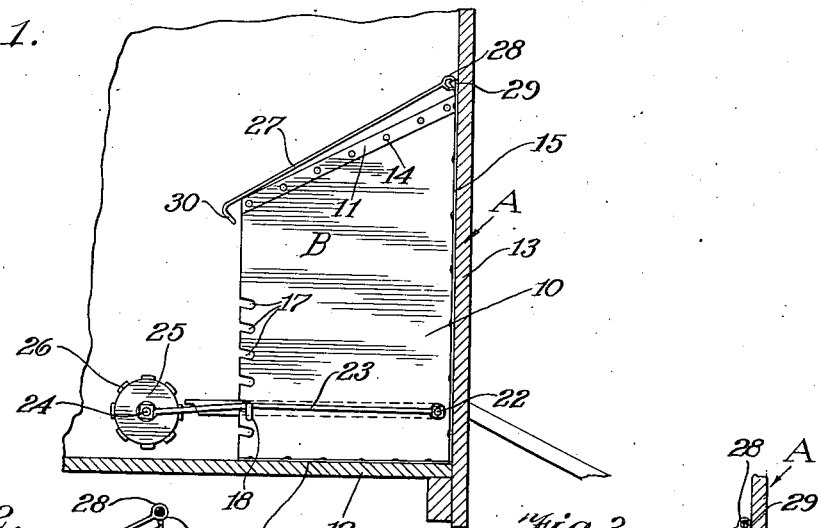
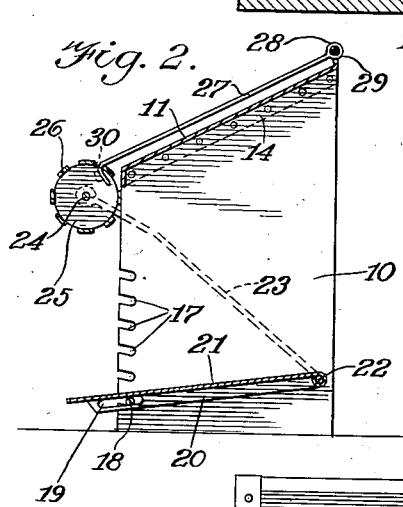
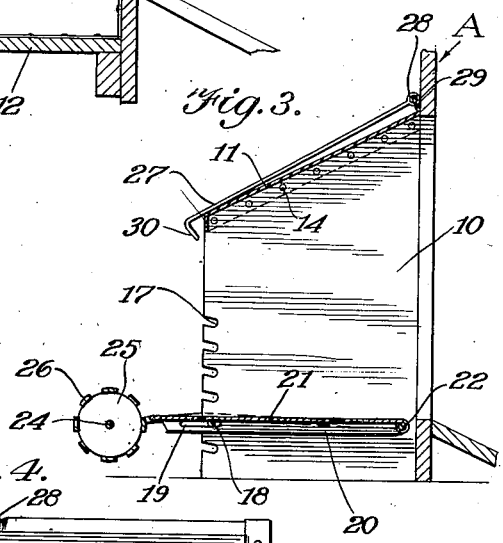
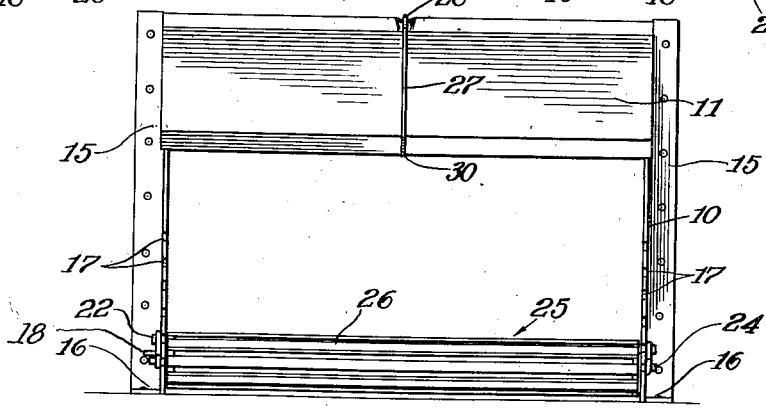
Joseph G. Lukes  INVENTOR
BY Victor J. Evans & Co.
ATTORNEYS Patented Mar. 17, 1942

2,276,403

UNITED STATES PATENT OFFICE 2,276,403

BROODER HOUSE ENTRANCE

Joseph G. Lukes, Waucoma, Iowa

Application January 29, 1940, Serial No. 316,248

3 Claims. (Cl. 119—22)

The invention relates to a brooder and more especially to an entrance structure for brooders.

The primary object of the invention is the provision of a structure of this character wherein small chicks according to the ages of the same can be conveniently admitted to the brooder and when therein will be prevented from making exit therefrom and in this way considerable trouble and annoyance will be obviated in that frequently where chicks are driven into an enclosure, such as a brooder, before complete trapping of the entire number to be contained therein certain of the chicks make an escape from the brooder or enclosure and in many instances these become injured from being forced back into the brooder.

Another object of the invention is the provision of a structure of this character wherein the entrance to a brooder can be regulated in accordance with the ages of the chicks to be housed therein, a free entrance being assured while such entrance under adjustment thereof effects a barrier for preventing the exit of the chicks from the brooder when within the same.

A further object of the invention is the provision of a structure of this character wherein the setup for regulating the entrance to a brooder is of novel construction, being conveniently regulated in conformity with the ages of the chicks to be confined or housed therein and prevents smaller chicks from making exit therefrom when within.

A further object of the invention is the provision of a structure of this character, which is simple, thoroughly reliable and effective in operation, susceptible of easy adjustment and inexpensive to manufacture.

With these and other objects in view, the invention consists in the features of construction, combination and arrangement of parts as will be hereinafter more fully described in detail, illustrated in the accompanying drawing, which discloses the preferred embodiment of the invention and pointed out in the claims hereunto appended.

In the accompanying drawing:

Figure 1 is a vertical sectional view of a brooder showing the structure in accordance with the invention in association therewith.

Figure 2 is a vertical sectional view through the entrance and showing the platform adjusted for extremely young or small chicks having free access or for free entrance to the brooder.

Figure 3 is a view similar to Figure 2 showing a change of adjustment of the entrance to the brooder for preventing the small chicks housed therein from making an exit therefrom.

Figure 4 is a front elevation of the device with the structure included in conformity with the invention.

Similar reference characters indicate corresponding parts throughout the several views in the drawing.

Referring to the drawing in detail, A designates generally a portion of a brooder of any housing of conventional type and at the entrance thereto from without is arranged an entrance structure B constituting the present invention. This entrance structure comprises a body 10 walled at opposite sides and having an inclined top 11 while a bottom 12 and a vertical wall 13 of the brooder effect a bottom and a walling to the entrance structure B. The top is suitably flanged for riveting as at 14 thereof to opposite sides of the said body 10 while these opposite sides are flanged at 15 and 16, respectively, for the tacking or otherwise fastening of the body 10 to the vertical wall 13 and the bottom 12. The body 10 at the side thereof next to the opening to the brooder is entirely open while the other side of said body 10 is open and in the side edges next to this open side of the body 10 are provided horizontally aligned notches 17 which are spaced vertically from each other in each edge. In selected notches of the series is adapted to be received a latching rod 18 loosely accommodated in elongated slots 19 longitudinally disposed in side members 20 carrying a bed or platform 21 which is vertically swingable on a horizontal axis. The hinge 22 creates the horizontal axis for the swinging of the platform 21 and its pintle is fastened in the opposite sides of the body 10 adjacent to the opening in the brooder A. Thus it can be seen that this platform 21 can be raised and lowered. On the raising and lowering of the platform 21 the same can be latched by the rod 18 in a selected raised or lowered position in that the said rod is engaged in selected notches 17. When the platform 21 is in a raised position within the body 10 and extremely young chicks are confined within the latter or within the brooder A, this will prevent the chicks from making an exit through the entrance structure from the brooder. When the platform 21 is in lowermost position, the young chicks within the brooder can readily pass outwardly through the entrance structure B to the outside of the brooder or the chicks outside of the brooder can pass within the latter through the said entrance structure without being retarded. It is a fact that extremely young chicks will fly from an elevated point to a lower point but will not fly from the lower point to the elevated point, whether the elevation of the point be slight or great.

Exteriorly of the sides of the body 10 and swingable at the hinged pintle 22 vertically is a pair of reel-carrying arms 23 to which is attached the journal 24 of a peripherally slatted tread reel 25, the slats 26 at the periphery thereof being spaced from each other a determined distance circumferentially of said reel. This reel when in a lower position with respect to the open side of the body 10 having the notches 17 next thereto will constitute a barrier to the escape or exit of chicks from within the brooder because when a chick attempts to perch upon the reel at the interior of the brooder the said reel will turn to effect the unperching of the chick causing it to fall back into the brooder and away from the platform 21. This reel is supported when in a lowered position by the side members 23 resting upon the rod 18 at the ends thereof beyond the opposite sides of the body 10. In this position the reel 25 at the uppermost portion thereof rises slightly above the plane of the platform 21. When the chicks are extremely young, the reel 25 need not be lowered to the plane of the platform 21 in that the said platform can be raised to a determined height that will retain the chicks within the brooder A. When the reel is not to be used as a barrier, it is latched in an elevated position as shown in Figure 2 of the drawing through the use of a latching bar 27 loosely connected at 28 to an upstanding ear 29 rising from the top 11 rearwardly of the body 10. This ear 29 is located at the center of the said body 10 next to the open side adjacent to the opening in the brooder A. The bar 27 is hand released from engagement with the reel 25 and hand latched therewith. The latching of the bar 27 with the reel 25 is had by engaging the end 30 of the same between the slats 26 peripherally of said reel. The platform 21 is raised or lowered in conformity with the sizes of the chicks to be housed by the brooder A or more particularly in conformity with the ages of such chicks. The distance between the reel 25 and the side of the body is not sufficient to allow a small chick to pass therebetween without stepping on the reel.

What is claimed is:

1. An entrance structure of the kind described comprising a body having opposed open sides, a platform within the body and swingable with relation to one of the open sides, means for fastening the platform when swung to a raised or lowered position, a tread reel movable relative to the platform and adapted to be supported next thereto at the free swingable end thereof, supports movably holding said reel, and means associated with the body for releasably holding the reel away from the platform.

2. An entrance structure of the kind described, comprising a body having opposed open sides, a platform within the body and pivotally supported adjacent the front open side, a transverse bar carried by the body at the rear open side and supporting the rear end of the platform, and a tread reel pivotally mounted on the pivot of the platform and supported thereby beyond the inner rear end of the same.

3. An entrance structure of the kind described, comprising a body having opposed open sides, a platform within the body and pivotally supported adjacent the front open side, a transverse bar transversely slidable in slots carried by the platform, notches arranged in the body at the rear open side to receive the bar, arms pivotally mounted on the pivot of the platform and supported thereby and extending beyond the rear end thereof, and a tread reel rotatably mounted in said arms.

JOSEPH G. LUKES.